United States Patent [19]

Bacher et al.

[11] Patent Number: 4,635,779
[45] Date of Patent: Jan. 13, 1987

[54] CLUTCH COVER ASSEMBLY

[75] Inventors: Michel Bacher, Domont; Paolo Rumignani, Neuilly-sur-Seine, both of France

[73] Assignee: Valeo, Paris, France

[21] Appl. No.: 613,191

[22] Filed: May 23, 1984

[30] Foreign Application Priority Data

May 24, 1983 [FR] France .................... 83 08522

[51] Int. Cl.⁴ .................................. F16D 13/44
[52] U.S. Cl. ..................... 192/89 B; 192/70.17; 192/109 R
[58] Field of Search ........... 192/89 B, 70.17, 109 R

[56] References Cited

U.S. PATENT DOCUMENTS

| | | | |
|---|---|---|---|
| 4,069,905 | 1/1978 | Gennes | 192/89 B |
| 4,210,233 | 7/1980 | Courbot | 192/89 B |
| 4,529,074 | 7/1985 | Alas | 192/70.12 |

FOREIGN PATENT DOCUMENTS 2212467 10/1978 Fed. Rep. of Germany .... 192/89 B

Primary Examiner—Larry I. Schwartz
Attorney, Agent, or Firm—Charles E. Brown; Charles A. Brown

[57] ABSTRACT

A clutch cover assembly suitable for automotive vehicles comprises a generally annular cover by means of which it is adapted to be attached to a reaction plate or flywheel. It further comprises a generally annular pressure plate which is constrained to rotate with the cover but movable relative to it in the axial direction. Elastic means in the form of a diaphragm spring bear on the cover to exert an axial force on the pressure plate through a bearing member. The bearing member is centered on the diaphragm spring by axial lugs which engage in notches provided on the diaphragm spring for this purpose. The bearing member carries a progressively acting spring washer.

17 Claims, 11 Drawing Figures

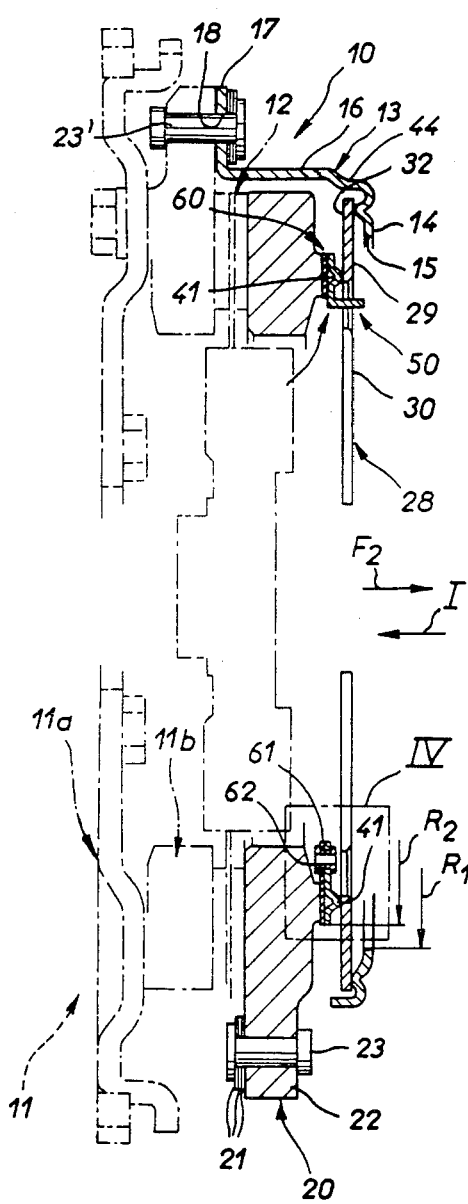
FIG. 2
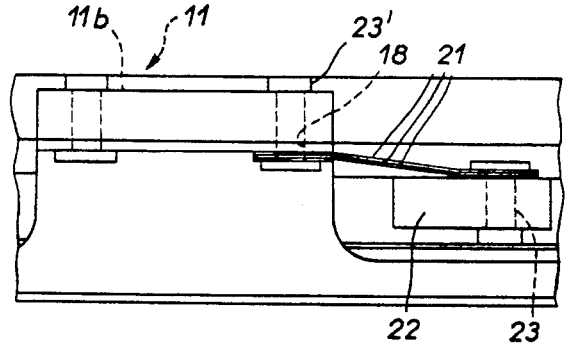
FIG. 3
FIG. 4
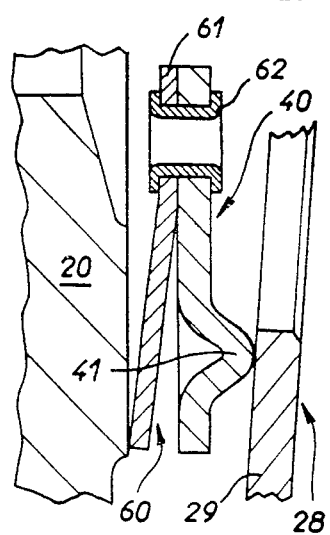
FIG. 5

CLUTCH COVER ASSEMBLY

BACKGROUND OF THE INVENTION

1. Field of the Invention

The present invention is generally concerned with clutch cover assemblies, that is to say the assembly of parts which, in order to make up a clutch, in particular for an automotive vehicle, is fastened as a unit to a reaction plate or flywheel with a friction disk disposed between them.

2. Description of the Prior Art

As is known, a clutch cover assembly generally comprises a first generally annular member called the cover through which it is adapted to be attached to the associated reaction plate, a second generally annular member called the pressure plate which is constrained to rotate with said cover whilst being mounted so as to be movable axially relative to the latter, and which is adapted to clamp the friction disk axially against the reaction plate, and elastic means which, for the purposes of this clamping or engagement, urge said pressure plate in the direction towards said reaction plate, said elastic means bearing for this purpose on the cover so as to exert a force in the axial direction on the pressure plate.

Elastic means of this kind may, for example, form part of a third generally annular member called the diaphragm spring which is inserted axially between the pressure plate and the cover and comprises, on the one hand, a circumferentially continuous peripheral part forming a Belleville washer and constituting said elastic means and, on the other hand, a central part divided into radial fingers by slots, said central part forming levers by means of which the assembly may be operated to disengage it.

Generally speaking, a diaphragm spring of this kind usually bears directly on the pressure plate having for this purpose an annular bead projecting in the axial direction, possibly circumferentially subdivided into separate bosses.

It has been proposed to have the diaphragm spring bear on the pressure plate through the intermediary of a fastened on member, referred to for convenience as the "bearing" member. A member of this kind is described in U.S. patent application Ser. No. 601,251 filed Apr. 17, 1984, now U.S. Pat. No. 4,529,074. In this application the bearing member has a two-fold function. Its first function is to close off cooling channels which the pressure plate features. Its second function is to provide an annular bead for the diaphragm spring to bear on in order to apply force to the pressure plate.

An objective of the present invention is to confer a further function on the bearing member on the pressure plate, and possibly to reduce its assembly time and consequently to reduce the manufacturing cost of clutch cover assemblies equipped with a bearing member of this kind.

SUMMARY OF THE INVENTION

The present invention consists in a clutch cover assembly comprising a generally annular cover adapted to be attached to a reaction plate, a generally annular pressure plate constrained to rotate with said cover and movable relative to said cover in an axial direction, a generally annular bearing member, elastic clutch release means regularly spaced in the circumferential direction on said pressure plate and adapted to bear on said cover and, via said bearing member, in said pressure plate, and axial lugs on said bearing member adapted to center said bearing member and said elastic clutch release means relative to one another.

By virtue of this arrangement, the bearing member is retained in the radial direction by the axial lugs. Advantageously, when these elastic means consist of the Belleville washer part of a diaphragm spring centered by the cover and which comprises radial fingers forming levers, the axial lugs on the bearing member may be engaged in notches between the fingers and slide in these notches, whilst still retaining the bearing member in the axial direction. This way it is possible to employ diaphragm springs of a kind well known to those skilled in the art.

The arrangement of the axial lugs on the bearing member to bring about relative centering of the latter and the diaphragm spring offers an additional and major advantage in certain types of clutch cover assembly.

The diaphragm spring is often centered in the cover by means of radial abutments formed in the latter and cooperating with the outside peripheral edge of the diaphragm spring, as is well known. For example, such abutments may consist of stamped sections of the lateral wall of the cover. Other means are also employed, such as centering pegs carried by the cover.

It is sometimes difficult to use these diaphragm spring centering means.

By virtue of the bearing member in accordance with the present invention, this problem is overcome through the centering of this bearing member on the pressure plate: the axial lugs on the bearing member, in accordance with the present invention, then have the function of centering the diaphragm spring on the pressure plate and consequently within the clutch cover assembly.

A further objective of the present invention is an arrangement by virtue of which the use of progressively acting members operative on engaging the clutch is considerably simplified.

The use of such progressively acting members operative on engaging the clutch, sometimes known as progressive elastic means, is well known per se. They comprise elastic means disposed in series with the elastic clutch release means, such as a diaphragm spring, for example. These progressive elastic means are designed to "retard" the action of the diaphragm spring at the time of engaging the clutch in order to avoid jerking.

Elastic means of this kind are described, for example, in French Pat. No. 1 392 569 filed Jan. 24, 1964 and in a first patent of addition thereto filed Dec. 8, 1964, both by the French company Férodo. The elastic means described therein fall into the categories of helical coil springs, corrugated spring washers or Belleville washers. These means are operative in the clutch cover assembly between the diaphragm spring and the pressure plate and to permit their use it is generally necessary to provide either means for fixing them to one of the two parts previously mentioned as constituting the clutch cover assembly, or a housing or chamber, in the pressure plate, for example. The combination of these arrangements is not practicable in certain cases, and in any event increases the production cost of the clutch cover assembly.

The present invention is also concerned with an arrangement simplifying the use of these progressive elastic means, as embodied in a clutch cover assembly of the type in accordance with the invention as defined hereinabove and characterised by the fact that the bearing member carries the progressive elastic means.

For example, the progressive elastic means may comprise a Belleville or "ONDUFLEX" type washer riveted to said bearing member.

Alternatively, elastic vanes or tangs may be used.

These arrangements considerably simplify the use of progressive elastic means, as it is sufficient to fasten an annular member exerting an elastic effect in the axial direction, such a Belleville or ONDUFLEX washer, to the bearing member, as by riveting, for example. By means of the axial lugs on the bearing member the combination of these two parts is then engaged in the notches on the diaphragm spring and the combination of these three parts (diaphragm spring, bearing member and progressive elastic means) is then fitted with the other parts of the clutch cover assembly in the known manner.

In a manner which is also advantageous the progressive elastic means may be incorporated in the bearing member.

The use of the bearing member and said progressive elastic means is further simplified in that the combination of these elements may constitute a single component.

Other objects and advantages will appear from the following description of examples of the invention, when considered in connection with the accompanying drawings, and the novel features will be particularly pointed out in the appended claims.

BRIEF DESCRIPTION OF THE DRAWINGS

FIG. 2 is a view in axial cross-section on the line II—II in FIG. 1, the clutch cover assembly being shown in the engaged position.

FIG. 3 is a partial view of the clutch cover assembly in the direction of the arrow 3 in FIG. 1.

FIG. 4 is a schematic view to a larger scale of the detail of FIG. 2 marked IV, the clutch cover assembly being shown in the released position.

FIG. 5 is a schematic view to the same scale as FIG. 4 showing an alternative embodiment.

DESCRIPTION OF THE PREFERRED EMBODIMENTS

Figure 1:
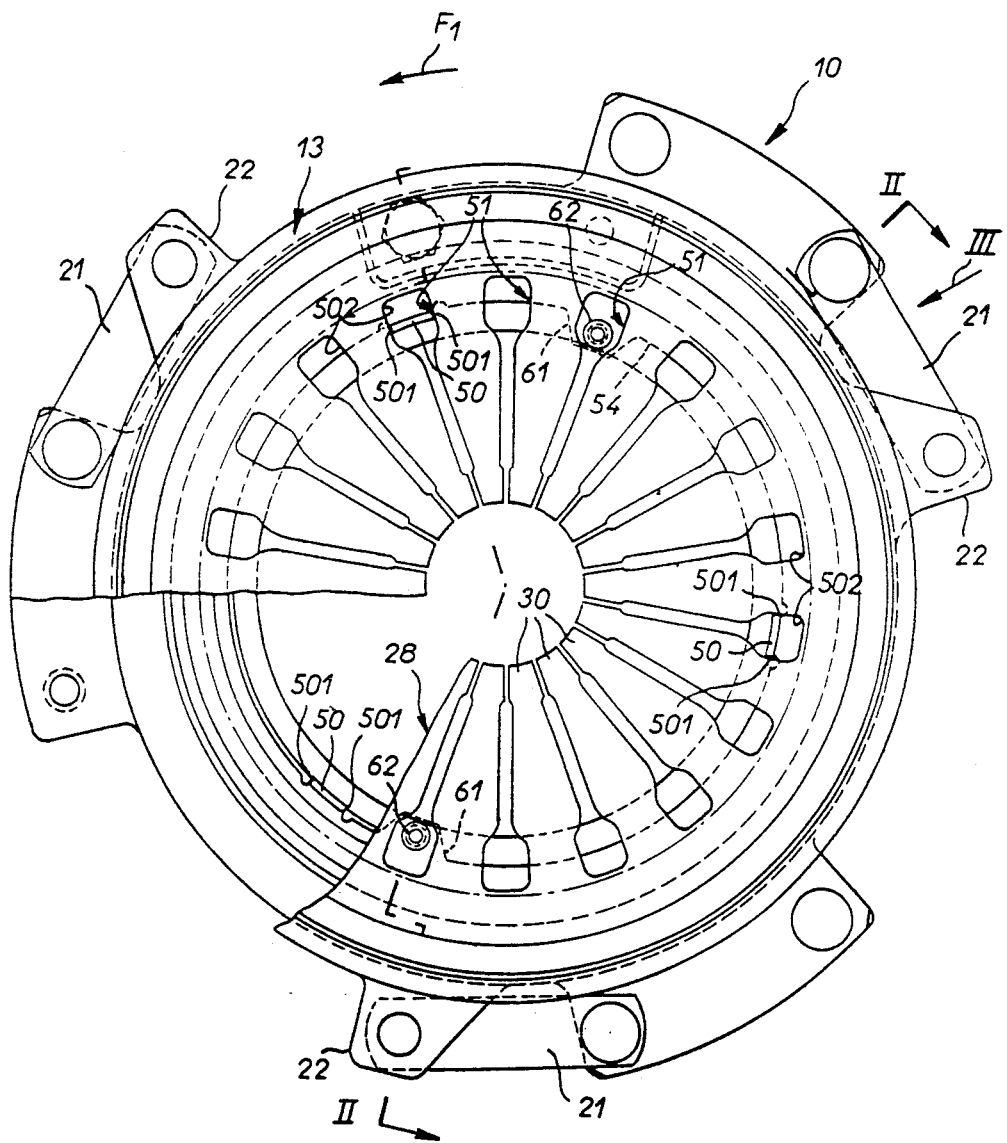
FIG. 1 is a view in elevation in the direction of the arrow 1 in FIG. 2 showing a clutch cover assembly employing the invention.

As shown in the figures, the clutch cover assembly in accordance with the invention is designed, in a manner known per se, to be attached to a reaction plate 11, which is only partially and schematically represented in FIG. 2, with inserted between it and a pressure plate 20 a friction disk 12 which is also shown only partially and schematically in FIG. 2.

In this embodiment, the reaction plate comprises two parts, a first part 11a attached to the flywheel of the motor of the vehicle and a second part 11b referred to hereinafter as the reaction plate proper. In this embodiment, the reaction plate proper 11b is intimately associated with the clutch cover assembly 10 since the latter is riveted, as will be explained hereinafter, to said reaction plate proper 11b whereas the latter is screwed to said first part 11a.

It need hardly be said that the present invention also concerns clutch cover assemblies well known to those skilled in the art which are screwed to the unitary construction reaction plate which often constitutes the flywheel of the motor.

In a manner also known per se, the clutch cover assembly 10 in accordance with the invention comprises a first generally annular member 13 called the cover through which it is adapted to be attached to the reaction plate 11.

This cover 13 comprises a bottom 14 in which is a central opening 15, a lateral wall 16 which extends in a generally axial direction and, at the end of the latter, radial lands 17 which are equally spaced in the circumferential direction at 120°, which extend in a generally radial direction and in which are spaced holes 18 for attaching the assembly to the reaction plate 11.

The central opening 15 in the cover 13 defines its inside peripheral contour.

This is in practice a circular contour of radius R1.

For clamping the friction disk 12, the clutch cover assembly 10 comprises a second generally annular member 20 called the pressure plate which is constrained to rotate with the cover 13 whilst being movable axially relative to the latter.

In the embodiments shown and as schematically indicated in the figures, the pressure plate 20 is to this end and in a manner known per se coupled to the cover 13 by elastically deformable tangs 21 which extend substantially tangentially to a circumference of the assembly (FIGS. 2 and 3).

For example, three sets of such tangs 21 are provided, regularly distributed circumferentially in pairs, at 120°, each comprising three superposed tangs 21, as shown.

Each of these sets of tangs 21 extends between, on the one hand, a lug 22 on the pressure plate 20 which projects radially for this purpose at the outside perimeter of the latter, to which it is fastened by a rivet 23 and, on the other hand, a radial land 17 on the cover to which it is attached by a rivet 23'.

It will be noted that in this embodiment the rivets 23' not only attach the sets of tangs 21 but also attach the cover 13 to the reaction plate, more particularly to the reaction plate proper 11b.

The clutch cover assembly 10 in accordance with the invention finally comprises, in a manner known per se, elastic clutch release means which, in order to bear axially on the pressure plate 20 and thus urge the latter in the direction towards the reaction plate 11 so as to clamp or engage the friction disk 12, bear on the cover 13. These elastic means are regularly distributed in the circumferential direction on the pressure plate 20.

In a manner also known per se, in the embodiments shown these elastic means form part of a third generally annular member 28 called the diaphragm spring which, inserted axially between the pressure plate 20 and the cover 13, comprises on the one hand a circumferentially continuous peripheral part 29 forming a Belleville washer constituting said elastic means and, on the other hand, a central part subdivided by slots into radial fingers 20 by means of which it is adapted to be acted on by a clutch release bearing (not shown) in order to release or disengage the friction disk 12.

In practice, the diaphragm spring 28 bears on the bottom 14 of the cover 13 through its circumferentially continuous part 29, the cover 13 having for this purpose an annular bead 32 projecting in the axial direction towards the pressure plate 20.

As the cover 13 is stamped from sheet metal in the embodiments shown, the bead 32 is simply formed by stamping.

In accordance with one aspect of the invention, it is through the intermediary of bearing member 14 that, conjointly, through its circumferentially continous peripheral part 29, the diaphragm spring 28 acts in the axial direction on the pressure plate 20.

In the embodiments shown, it bears axially on this bearing member 40 in the axial direction, the latter member featuring for this purpose an annular bead 41 projecting axially in the vicinity of its inside perimeter, in the axial direction towards the bottom 14 of the cover 13.

Like the annular bead 32 on the cover 13, this annular bead 41 is obtained in practice simply by stamping the sheet metal which constitutes the bearing member 40 in the embodiments shown.

The embodiments shown in FIGS. 1 to 4 relate to a "pull" type clutch, that is to say a clutch in which the associated clutch release bearing must operate in traction on the central part of the diaphragm spring 28 subdivided into radial fingers 30, in the direction of the arrow F2 in FIG. 2, that is in the axial direction from the pressure plate 20 towards the bottom 14 of the cover 13, and the diameter of the circumference along which the diaphragm spring 28 acts axially on the pressure plate 20, through the intermediary of the bearing member 50, is therefore less than that of the circumference along which it bears axially on the cover 13.

It follows that no special coupling means are required between the diaphragm spring 28 and the cover 13, other than stampings 44 (FIG. 2) which are formed from place to place or circumferentially continuously on the lateral wall 16 of the cover 13, to center the diaphragm spring 28 relative to the latter.

It is for this reason that, as indicated hereinabove, the inside peripheral contour of the cover 13 is coincident with that of its central opening 15, which is circular.

To benefit from this arrangement, the radius R2 of the outside peripheral contour of the bearing member 40 is less than or the same as that R1 of the inside peripheral contour of the cover 13.

As a result, the bearing member 40 and the cover 13 may with advantage be formed from the same blank, appropriately cut and stamped.

In other words, the bearing member 40 is formed from what is normally waste material from the manufacture of the cover 13.

Generally speaking and in accordance with the invention the bearing member 40 is centered by axial lugs 50 on the elastic clutch release means which bear on the cover 13 so as to press axially on the pressure plate 20.

More precisely, as the elastic means form part, in the embodiments shown, of the diaphragm spring 28 comprising a peripheral part forming the Belleville washer 29 which constitutes said elastic means, the axial lugs 50 are engaged in notches 51 formed between the radial fingers 30, at the roots thereof, in the vicinity of the inside perimeter of the Belleville washer 29. In the embodiment shown, there are notches 51 of this kind formed between all the radial fingers 30, whereas there are three axial lugs 50 regularly spaced at 120° in the circumferential direction over the inside perimeter 54 of the bearing member 40 (FIGS. 1 and 2). In this instance, the lateral edges 501 (FIG. 1) are permitted to cooperate with the lateral contour 502 of the notches 50.

By virtue of these arrangements, when the axial lugs 50 on the bearing member 40 are engaged in the notches 51 in the diaphragm spring 28 the bearing member 40 is automatically centered on the diaphragm spring. As the bearing member is disposed between the diaphragm spring 28 centered in the cover and the pressure plate 20 and since significant pressure is exerted on it by the diaphragm spring, no other fastening means is required to attach the bearing member 40 to one or other of the two parts of the clutch cover assembly.

The clutch cover assembly 10 in accordance with the invention further comprises, in a manner known primarily through the aforementioned French Pat. No. 1 392 569 and the first patent of addition thereto (86 983), progressive elastic members or means disposed in series between the diaphragm spring 28 and the pressure plate 20.

In the embodiment shown in the figures, these progressive elastic means consist of a Belleville type washer 60 disposed between the pressure plate 20 and the bearing member 40.

Generally speaking and in accordance with the invention, said member 40 supports these progressive elastic means 60.

More precisely, in the embodiment shown these elastic means 60 are riveted to radial extensions (see FIGS. 1 and 2) on the inside or outside perimeter of the bearing member 40. In this instance, these radial extensions 61 are regularly distributed in the circumferential direction along the inside perimeter 54 of the bearing member 40.

In the embodiments shown in FIGS. 1 to 4, these inside radial extensions are two in number and at diametrically opposite positions, the rivets attaching the progressive elastic means 60 being visible at 62.

By virtue of these arrangements the use of these progressive elastic means, in this instance the Belleville washer 60, is significantly simplified since it is sufficient to rivet the Belleville washer to the bearing member 40 before the combination of these two parts is fitted into the clutch cover assembly 10 in accordance with the invention.

In FIGS. 1 to 3 the clutch cover assembly is shown in the engaged position, the Belleville washer 60 being flattened by virtue of the pressure exerted by the bearing member 40 on which the diaphragm spring 28 presses.

When the clutch cover assembly is in the released position (FIG. 4), the Belleville washer 60 returns to a so-called "rest" position. It will be noted that at this time the progressive elastic means constituted by this Belleville washer 60 tends to urge the pressure plate in the direction towards the friction disk 12, to the extent that there is still contact with this plate. It is known that there is then a risk of the pressure plate rubbing on the friction disk in this disengaged position, that is to say a risk of more or less severe friction between these two parts.

In the embodiment shown in FIGS. 1 to 4, the Belleville washer 60 is selected so that in the rest position (disengaged) there is no rubbing between the two parts.

Alternative embodiments of the clutch cover assembly in accordance with the present invention will now be described with reference to FIGS. 5 to 11. In the figures, parts common to FIGS. 1 to 11 retain the same reference numerals whereas parts having equivalent functions, but not of an identical nature, have reference numerals analogous to those of FIGS. 1 to 4 to which are added the following suffixes: "a" for the FIG. 5 embodiment; "b" for the FIG. 6 embodiment, "c" for the FIGS. 7 and 8 embodiment and "d" for the FIGS. 9 to 11 embodiment.

FIG. 5 shows an embodiment in which means are provided for limiting axial expansion of the progressive elastic means on releasing the clutch.

In this embodiment, the progressive elastic means form part of a Belleville type washer 60a comprising inward radial extensions 70 which are regularly distributed in the circumferential direction along the inside perimeter of this washer. Each of these extensions features a hole 76.

The bearing member 40a is of substantially the same design as the bearing member 40 shown in FIGS. 1 to 4. It has extensions 71 which are regularly spaced in the circumferential direction along the inside perimeter of the bearing member 40a. Each of these extensions 71 features a hole 72.

As shown in FIG. 5, the extensions 70 and 71 and the holes 76 and 72 therein are lined up with one another. A peg 73 is riveted into each of the holes 72. This peg 73 comprises a cylindrical body 77 and a cylindrical head 78 of much larger diameter. The combination of these parts is designed so that the body 77 slides in the hole 76 and the head 78 forms a stop.

A recess 75 is formed in the pressure plate 20 in line with the radial extensions 70.

As shown in FIG. 5, in the released position the head 78 of the peg 73 is in abutting relationship with the extension 70, so limiting axial expansion of the Belleville washer 60a on releasing the clutch.

Figure 6:
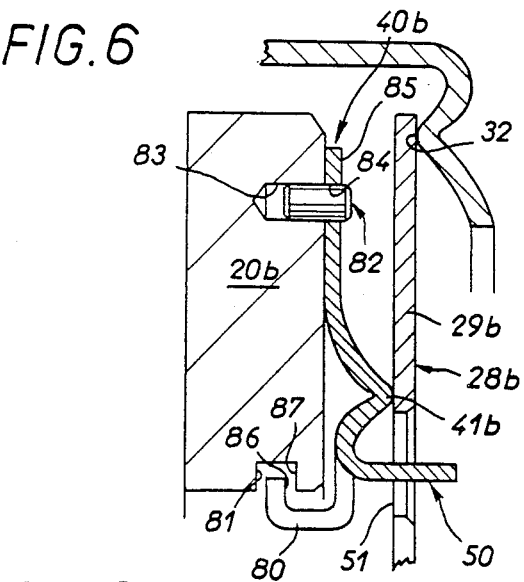
FIG. 6 is a view in partial axial cross-section through the clutch cover assembly, corresponding to FIG. 2 and showing a further embodiment.

FIG. 6 shows a particularly advantageous embodiment in that the progressive elastic means are incorporated into the bearing member 40b which is substantially in the form of a Belleville washer comprising an annular bead 41b and axial lugs 50 distributed regularly in the circumferential direction around the inside perimeter of the annular bead 41b.

Thus the same part 40b functions as a progressive member or means.

Means are also provided in this instance to limit axial expansion of the Belleville washer 40b on releasing the clutch. In this embodiment these means consist of curved lugs 80 on the bearing member cooperating abutment-fashion with recesses 81 formed in this instance on the inside peripheral edge of the pressure plate 20b. Each lug 80 comprises a radial extension 36 facing one side 87 of the recess 81 for cooperation therewith in abutting relationship on releasing the clutch. It will be understood that the lugs 80 and the recesses 81 are regularly distributed in the circumferential direction.

The embodiment of FIG. 6 is also a particularly advantageous embodiment of the invention. Whereas in the embodiment shown in FIGS. 1 to 4 the diaphragm spring 28 is centered in the cover 13 by means of stampings 44 formed on the lateral wall 16 of said cover, the bearing member 40 being itself centered on this diaphragm spring 28 by the axial lugs 50, in the embodiment shown in FIG. 6 the bearing member 40b is centered on the pressure plate 20b by means of pegs 82 which are force-fitted into holes 83 in the pressure plate 20b and holes 84 in the extensions 85 of the bearing member 40b.

In this embodiment, the diaphragm spring 28b is centered on the pressure plate 20b by means of the axial lugs 50 of the bearing member 40b, these axial lugs 50 cooperating, as in the embodiment described with reference to FIGS. 1 to 4, with notches 51 formed between the radial fingers of the diaphragm spring.

Thus in this embodiment there is no need to provide other centering means for the diaphragm spring.

FIGS. 7 to 11 illustrate two further embodiments in which the progressive elastic means are not of generally annular form.

Figure 7:
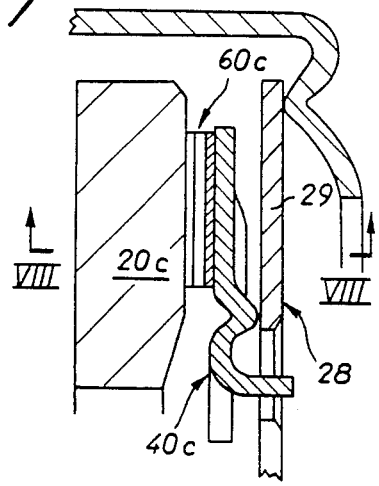
FIG. 7 is a view in partial axial cross-section of the clutch cover assembly corresponding to FIG. 2 and showing a fourth embodiment.
Figure 8:
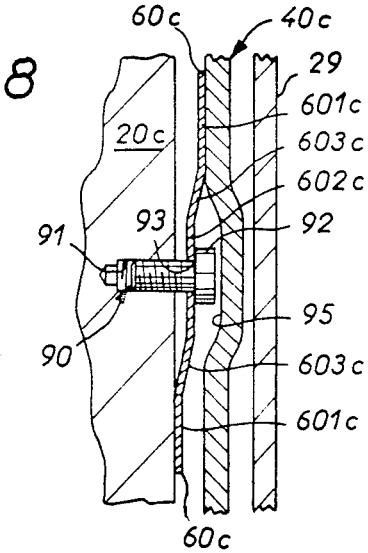
FIG. 8 is a partial view of the clutch cover assembly in cross-section on the line VIII—VIII in FIG. 7.

In FIGS. 7 and 8 these progressive elastic means are in the form of elastic vanes 60c which are regularly distributed in the circumferential direction on the pressure plate 20. In cross-section (FIG. 8) these elastic vanes 60c are seen to comprise two end portions 601c which are axially offset, in the rest position, relative to a median part 602c, to which these end parts are linked by inclined areas 603c.

Means are also provided for limiting the axial deployment of these vanes on releasing the clutch. In this embodiment these limiting means consist in screws 90 each screwed into a threaded hole 91 in the pressure plate 20c. These screws 91 pass through holes 93 in the median part 602c of the vanes 60c. The abutment means consist of a head 92 which comes into abutting relationship with the median part 602c in question (FIG. 8) on releasing the clutch.

In this embodiment, the bearing member 40c has, facing the screws 90, a recess 95 formed by stamping an appropriate portion of the bearing member 40c. This accommodates each of the heads 92.

Figure 9:
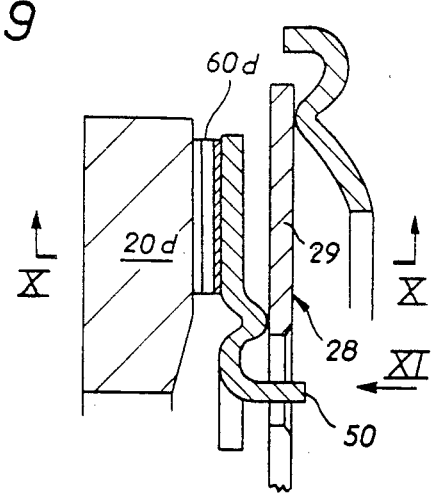
FIGS. 9 and 10 are views corresponding to FIGS. 7 and 8 showing a fifth embodiment.
Figure 11:
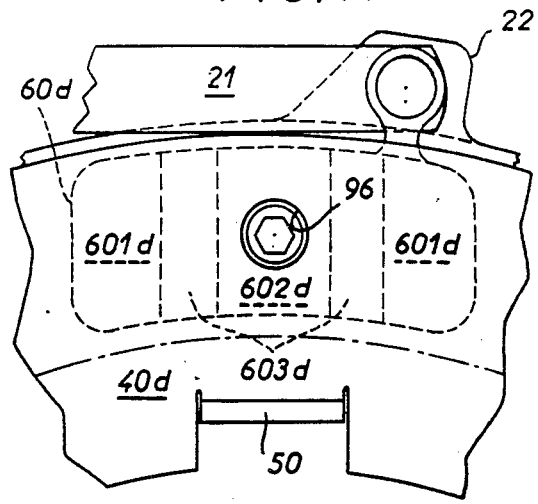
FIG. 11 is a partial view in cross-section on the line XI—XI in FIG. 9.

In the embodiment shown in FIGS. 9 and 11, the progressive elastic means consist of vanes 60d similar to the vanes 60c of the embodiment shown in FIGS. 7 and 8. The means for limiting the deployment of these vanes on releasing the clutch also consist of screws 90d cooperating with the central portions 602d of the vanes 60d.

In this embodiment (see FIGS. 10 and 11), each of the cylindrical heads 92d is engaged in a hole 96 in the bearing member 42, substituted for the recess 95 in the member 40c in the embodiment shown in FIGS. 7 and 8.

Figure 10:
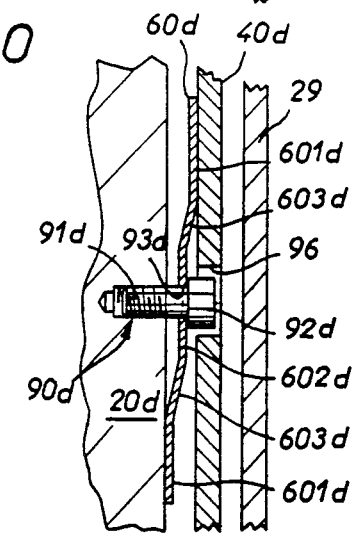

In the embodiment shown in FIGS. 9 to 11, the head 92d is hollow and comprises a polygonal recess (hexagonal, for example) to enable it to be removed using a key of complementary shape.

This special arrangement of the hole 96 and the socket-head screw 90d simplifies removal of the bearing member 40d from the pressure plate 20d.

In the embodiments of FIGS. 7 to 10, each vane 60c or 60d is fixed to a lug 22 of the pressure plate, by means of the rivet 23 attaching the drive tangs. A lug fastened to one end portion and extending the radial direction is provided for this purpose. In the embodiment of FIGS. 9 and 10, these arrangements are visible in FIG. 11.

It will be understood that various changes in the details, materials and arrangements of parts, which have been herein described and illustrated in order to explain the nature of the invention, may be made by those skilled in the art within the principle and scope of the invention as expressed in the appended claims.

We claim:

1. Clutch cover assembly comprising a generally annular cover adapted to be attached to a reaction plate, a generally annular pressure plate constrained to rotate with said cover and movable relative to said cover in an axial direction, a generally annular bearing member, elastic clutch release means regularly spaced in the circumferential direction on said pressure plate, said elastic clutch release means being positioned to bear on said cover and, via said bearing member, on said pressure plate, and axial lugs on said bearing member adapted to center said bearing member and said elastic clutch release means relative to one another.

2. Clutch release bearing according to claim 1, further comprising progressive elastic means supported on said bearing member and disposed in series between said pressure plate and said elastic clutch release means.

3. Clutch release bearing according to claim 1, further comprising a generally annular diaphragm spring of which said elastic clutch release means form part, said diaphragm spring being inserted axially between said pressure plate and said cover and has a circumferentially continuous peripheral part constituting a Belleville washer and a central part divided into radial fingers.

4. Clutch release bearing according to claim 1, wherein said axial lugs are regularly spaced in the circumferential direction along the inside perimeter of said bearing member.

5. Clutch release bearing according to claim 1, wherein said bearing member comprises three axial lugs.

6. Clutch release bearing according to claim 3, wherein said Belleville washer is formed with notches adjacent an inside perimeter thereof at locations between said fingers of said diaphragm spring and said axial lugs are engaged in said notches.

7. Clutch release bearing according to claim 2, wherein said progressive elastic means comprise a ring which is elastically deformable in the axial direction and which is attached to said bearing member.

8. Clutch release bearing according to claim 7, wherein said bearing member comprises radial extensions which are regularly spaced in the circumferential direction along its perimeter and to which said elastically deformable ring is attached.

9. Clutch release bearing according to claim 7, wherein said bearing member comprises at least two radial extensions which are regularly spaced in the circumferential direction along its inside perimeter and to which said elastically deformable ring is attached.

10. Clutch release bearing according to claim 7, wherein said elastically deformable ring is a Belleville washer.

11. Clutch release bearing according to claim 7, wherein said elastically deformable ring is of the "ONDUFLEX" type.

12. Clutch release bearing according to claim 2, wherein said progressive elastic means are incorporated in said bearing member.

13. Clutch release bearing according to claim 2, wherein said progressive elastic means comprise elastic vanes which are regularly spaced in the circumferential direction.

14. Clutch release bearing according to claim 7, further comprising means for limiting axial expansion of said progressive elastic means.

15. Clutch release bearing according to claim 14, wherein said limiting means comprise curved lugs attached to said bearing member and wherein said pressure plate comprises a peripheral edge formed with recesses with which said curved lugs are adapted to cooperate in an abutment type relationship.

16. Clutch release bearing according to claim 1, wherein said diaphragm spring is centered relative to said cover and said bearing member is centered relative to said cover through the intermediary of said diaphragm spring and by means of axial lugs on said bearing member.

17. Clutch release bearing according to claim 1, wherein said bearing member is centered by said pressure plate and said diaphragm spring is centered on said pressure plate by means of said axial lugs on said bearing member.

* * * * *